July 4, 1950 E. G. TIDWELL 2,514,169
SCRAPER
Filed Jan. 28, 1946 2 Sheets-Sheet 1

INVENTOR.
Eldon G. Tidwell.
BY
Fishburn & Mullendore
ATTORNEYS

July 4, 1950 E. G. TIDWELL 2,514,169
SCRAPER
Filed Jan. 28, 1946 2 Sheets-Sheet 2
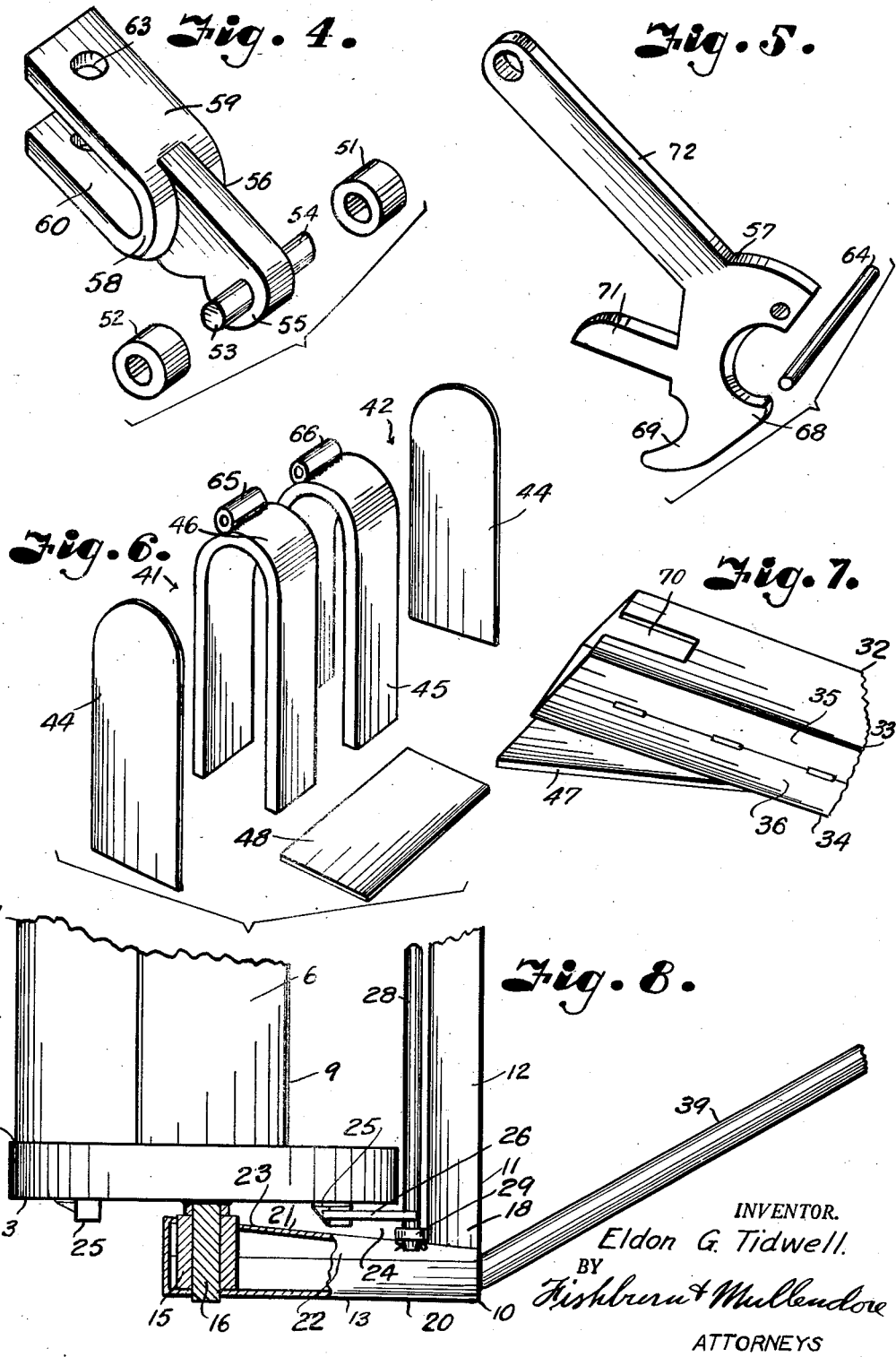
INVENTOR.
Eldon G. Tidwell
BY
Fishburn & Mullendore
ATTORNEYS Patented July 4, 1950

2,514,169

UNITED STATES PATENT OFFICE 2,514,169

SCRAPER

Eldon G. Tidwell, Cherokee, Okla.

Application January 28, 1946, Serial No. 643,867

8 Claims. (Cl. 37—140)

1

This invention relates to earth handling machines and particularly to a rotary scraper for scraping, conveying and spreading or dumping earth materials as in the grading, construction or repair of highways, dams and similar grading jobs.

The principal object of the invention is to provide improved control for the various functions performed by such machines.

Other objects of the invention are to provide an improved hitch whereby the load acts evenly on all hitch surfaces regardless of the angle of pull of the tractor vehicle; to provide a positive action non-clogging hitch for automatically effecting position of the scraper blade; to provide a rotary scraper structure which permits backing of the device when either full or empty; and to provide a substantially strong, light-weight frame construction.

In accomplishing these and other objects of the invention hereinafter pointed out, I have provided improved structure, the preferred form of which is illustrated in the accompanying drawings wherein:

Fig. 4 is a perspective view of the parts of the hitch clevis shown in disassembled spaced relation.

Fig. 5 is a perspective view of the hitch latch and its supporting pin.

Fig. 6 is a perspective view of the hitch housing parts shown prior to assembly.

Fig. 7 is a perspective view of the end of the scraper tongue.

Fig. 8 is a plan view of one side of the scraper and showing the tub trunnion and its bearing in section.

Referring more in detail to the drawings:

1 designates a scraper embodying the features of the present invention and which includes a tub 2 having substantially disk-like ends or heads 3 and 4. The ends 3 and 4 are inwardly flanged to engage the ends of an arcuate wall

Figure 1:
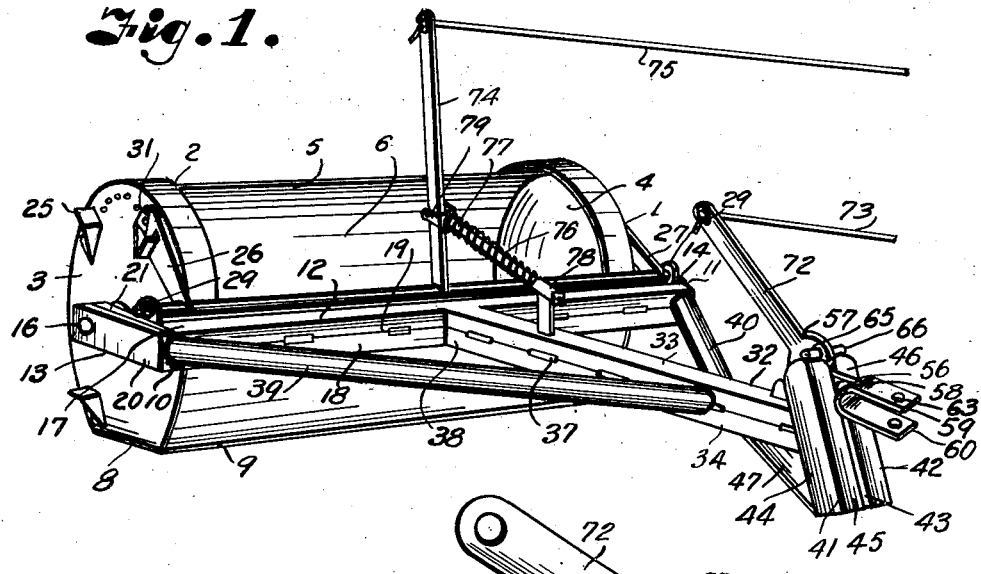
Fig. 1 is a perspective view of a rotary scraper constructed in accordance with the present invention.

2 sheet 5 that extends part way around the ends 3 and 4 so as to leave an open side 6 for the entrance and discharge of material. The portion of the sheet adjacent the bottom edge of the opening is preferably flattened as at 8 and carries a scraper blade 9 extending thereacross. The tub just described is journalled for rotation on the longitudinal axis thereof in a frame 10. The frame 10 includes a substantially yoke-shaped member 11 including a cross member 12 having laterally spaced arms 13 and 14. Fixed to the ends of the arms are bearings 15 which journal spindles 16 that project outwardly from the end members in the axis of the tub as best shown in Fig. 8. The yoke member 11 is preferably formed by channels 17 and 18 arranged with the flanges 19 thereof in edge to edge registry and secured together by welding or the like. The arms are similarly formed by channels 20 and 21, but the inner channels 21 have the flanges 22 cut on a bias so that the webs 23 thereof diverge from the cross member with respect to the web of the outer channels 20 (Fig. 8) so as to accommodate the bearings 15 and provide space 24 between the arms and ends of the tub to accommodate stop or latch engaging stops or lugs 25. Certain of the lugs 25 may be adjustably mounted on the ends of the tub and are adapted to be engaged by latches 26 and 27 that are fixed to a rock shaft 28 extending parallel with the cross member 12 and having the ends thereof journalled in bearings 29 carried by the arms 13 and 14 as shown in Fig. 1. The latch members have notches 30 adapted to engage the respective sides of the stops 25 as best shown in Fig. 1. When the latches are engaged with one of the stops, the tub is retained from rotation relative to the frame as when carrying a load of material in the tub in backing or pulling of the scraper as later described. The heads of the latches are preferably beveled as at 31 so that as the tub rotates on its axis and rolls along the ground, the lugs will strike the beveled end to raise the latches and thereby permit engagement of the notches with the stop lugs. The frame also includes a tongue 32 composed of channel members 33 and 34 arranged with the flanges 35 and 36 in edge to edge registry and secured together by welding or the like as indicated at 37. The rear end 38 of the tongue is welded or otherwise secured to the center of the cross member 12 and the forward end is suitably braced from the outer ends of the cross member, preferably by tubes 39 and 40.

Figure 2:
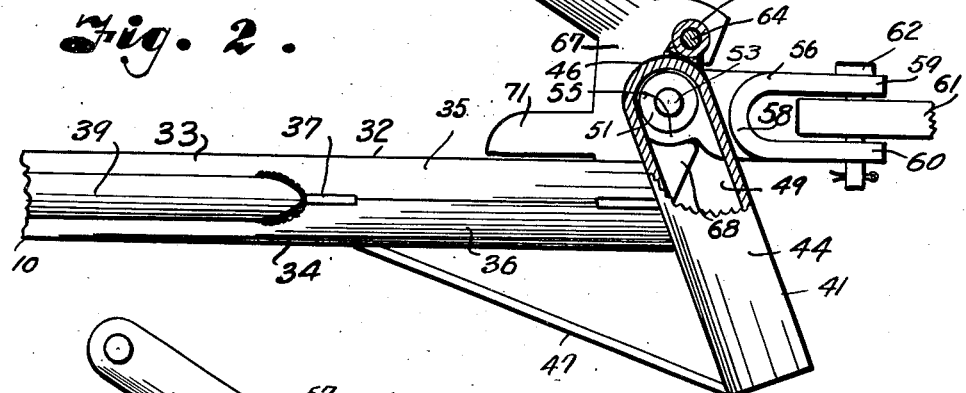
Fig. 2 is an enlarged side elevational view of the hitch for the scraper, partly in section and showing the hitch in position to lower the blade of the scraper tub.

The forward end of the tongue is cut on a downwardly and forwardly sloping angle as best shown in Fig. 7 to attach guides 41 and 42, the guides being spaced apart to provide a passageway 43 therebetween. The guides 41 and 42 are built of channel-like shape and have webs 44 and laterally extending flanges 45. The flanges 45 of each guide are curved inwardly and interconnected across the upper ends of the guides in the form of semi-circular stops 46 (Fig. 2). The guide members are arranged with the flanges in facing registry and are spaced apart to form the passageway 43 for a purpose later described.

Figure 3:
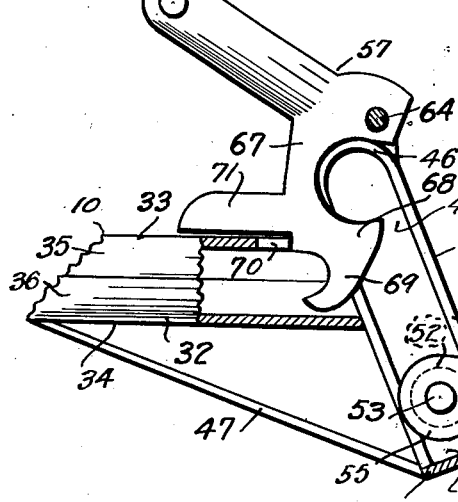
Fig. 3 is a similar view showing the hitch in position for elevating the blade.
Figure 9:
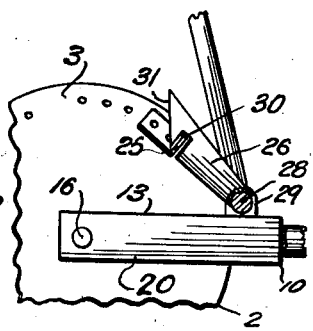
Fig. 9 is a fragmentary side elevational view of the tub particularly illustrating the latch for retaining the tub from rotation as when scraping or carrying a load.

The guide members being welded to the sloping end of the tongue are arranged so that they extend at an inclined angle, the lower ends extending forwardly and below the tongue and the upper ends extending rearwardly as shown in Fig. 2. The lower ends of the guides are suitably braced from the tongue by a strap-like member 47 having one end welded to the lower ends of the respective guides and the other end welded to the tongue adjacent the attaching points of the tubular braces previously described. The lower ends of the guides are closed by a cross plate 48 as best shown in Figs. 3 and 6.

The guides as above described form enclosed tracks 49 on opposite sides of the passageway 43 to accommodate rollers 51 and 52 journalled on spindles 53 and 54 that extend laterally from opposite sides of a latch engaging portion 55 of a clevis 56 whereby the clevis is adapted to move from one end of the tracks to the other when released by a latch 57 later described.

The clevis includes a yoke-shaped portion 58 extending forwardly from the latch engaging portion and which has arms 59 and 60 to connect by means of a draft bar 61 with a source of draft power such as a tractor (not shown). The connection is made with the draft bar by means of a coupling pin 62 extending through openings 63 in the arms of the clevis and a registering opening in the rear end of the draft bar.

The latch 57 previously mentioned is pivotally mounted on a cross pin 64 having ends thereof journalled in sleeve-like bearings 65 and 66 fixed to the respective upper ends of the guides by welding or the like as shown in the drawings. The latch includes a plate-like head 67 operable in the passageway 43 and includes a hook portion 68 adapted to engage under the latch engaging portion 55 of the clevis to support the clevis at the upper ends of the guides as when scraping material into the tub. The head has a cam end 69 which extends through a notch-like opening 70 in the forward end of the tongue as shown in Fig. 3 and which is adapted to be engaged by the latch engaging portion of the clevis when the clevis moves upwardly within the guide to effect engagement by the latch. The latch also has a stop 71 extending laterally and rearwardly therefrom to engage the upper face of the tongue to retain the cam portion of the latch in position to be engaged by the clevis. The latch is adapted to be released by an arm 72 that extends upwardly and rearwardly from the head and is operated by a cable 73 leading to a position adjacent the operator's seat on the tractor vehicle. The rock shaft is provided with an arm 74 that extends upwardly therefrom near the center thereof and is connected by a similar cable 75 leading to a position adjacent the tractor operator. The tub latches are normally retained in position to engage the stop lugs by a coil spring 76 mounted on a rod 77 having one end slidable in a bracket 78 mounted on the tongue. The opposite end of the rod is connected by a yoke 79 with the arm 74, the spring being arranged so that one end engages the bracket and the other the yoke to normally move the rock shaft in a clockwise direction for effecting engagement of the stop lugs in the ends of the tub.

Assuming that the scraper is constructed and assembled as described and is connected with a tractor vehicle by means of the hitch, the tub 2 is normally supported with the flattened portion 8 in contact with the ground and the scraper blade 9 in elevated position so that the tub may be moved without scraping material into the tub. In this position the latches 26 and 27 are engaged with one of the stops 25 as shown in Fig. 1 and the clevis 56 is released from the latch 57 so that the clevis 56 is at the lower ends of the guides 41 and 42. In this position the draft pull is such as the tongue is elevated to elevate the scraper blade. When it is desired to lower the scraper blade for filling the tub, the latches are released by jerking on the cable 75 to effect rocking of the rock shaft whereupon the tub is free to roll on the ground to bring the scraper into scraping position, at which time the latches re-engage a stop lug, and resistance to movement of the blade causes the tongue to swing downwardly and effect elevation of the clevis to the top of the guides where it is re-engaged with the latch. When the scraper is filled, the clevis latch 57 is released by pulling on the cable 73. The clevis is then free to roll to the bottom of the guides. This action elevates the tongue and blade of the scraper upon forward movement of the draft vehicle. To dump the load the latches 26 and 27 are released by pulling on the cable 75. The tube then rolls on the ground and the material is spread upon the ground. If the latch is held out to allow complete rotation of the tub, the material is merely dumped in a pile and the tub rolls thereover. Upon release of the cable 75, the spring 76 returns the rock shaft to effect re-engagement of the latches 26 and 27. Upon engagement of the latches, the impact effects a downward movement of the tongue which causes re-positioning of the clevis 56 at the top of the guides for re-engagement of the latch 57.

From the foregoing it is obvious that I have provided a scraper that is of substantially automatic operation and which is provided with a hitch of simple and inexpensive construction and wherein the operating parts are enclosed by the house-like guides to exclude dirt and the like that will tend to interfere with operation of the clutch.

It is also obvious that the construction of the tub latches permits movement of the scraper in either direction as when being drawn by the tractor vehicle or when backing and manipulating the scraper.

The enclosing sides 44 of the guides strengthen the entire hitch and the center pull allows the latch to contact the clevis rather than the rollers, thereby making a positive lock. There is also less wear on the hitch so that it operates positively and smoothly over a long period of time.

What I claim and desire to secure by Letters Patent is:

1. In a scraper of the character described, a tongue, laterally spaced inclined guides on the tongue, a clevis having a latch engaging portion operable in the space between said guides, means extending laterally from said latch engaging portion for engaging said guides to anchor the clevis for movement from top to bottom of said guides, a latch, and means supporting the latch for engagement with said latch engaging portion of the clevis when the clevis is at the upper ends of the guides.

2. In a scraper of the character described, a tongue, laterally spaced inclined guides on the tongue, a clevis having a latch engaging portion operable in the space between said guides, means on said latch engaging portion for engaging said guides to anchor the clevis for movement from top to bottom of said guides, a latch, and means for pivotally mounting the latch on said guides to engage the latch engaging portion of the guides.

3. In a scraper of the character described, a tub of substantially cylindrical shape adapted to turn about the axis thereof, a frame having laterally spaced arms, spindles projecting from ends of the tub in the axis thereof, bearings carried by said arms for journalling the spindles, a rock shaft on the frame, selective means for locking the tub from rotation in either forward or rearward movement of the scraper, said frame including a tongue, lateral guides on the forward ends of the tongue and inclined in a downward and forward direction in respect to the tongue, a latch at the upper end of the guide, a clevis having a latch engaging portion, means on the clevis for engaging the guides, and means for releasing the latch from the clevis.

4. In a scraper of the character described, a tub of substantially cylindrical shape adapted to turn about the axis thereof, a frame having laterally spaced arms, spindles projecting from ends of the tub in the axis thereof, bearings carried by said arms for journalling the spindles, a rock shaft on the frame, latches on the rock shaft having notched heads, stop lugs on the ends of the tub adapted to be engaged by the notched heads of the latches, said frame including a tongue, laterally spaced guides on the forward ends of the tongue and inclined in a downward and forward direction in respect to the tongue, a latch at the upper ends of the guides, a clevis having a latch engaging portion between the guides, means on the latch engaging portion for engaging the guides, and means for releasing the latch from the latch engaging portion of the clevis.

5. In a scraper hitch, laterally spaced inclined guides, a clevis having a latch engaging portion operable in the space between said guides, means extending laterally from said latch engaging portion for engaging said guides to anchor the clevis for movement from top to bottom of said guides, a latch, and means supporting the latch for engagement with said latch engaging portion of the clevis when the clevis is at the upper ends of the guides.

6. In a scraper hitch, laterally spaced housings having facing open sides and inclined flanges forming guide tracks, a clevis having a latch engaging portion operable in the space between said housings, roller supports extending laterally from said latch engaging portion, rollers on said supports for engaging said guide tracks to anchor the clevis for movement along said tracks, a latch, and means for pivotally mounting the latch on said housings to engage the latch engaging portion of the clevis.

7. In a hitch of the character described, laterally spaced housings having facing open sides and forming guide tracks, a clevis having a latch engaging portion operable in said space between the housings, rollers carried by the latch engaging portion of the clevis and operable on the guide tracks, a latch pivotally connected to the housings having a hook portion for latchably engaging the latch engaging portion of the clevis, a cam portion engageable by the clevis to rock the latch, and a stop arm for supporting the latch in latch engaging position.

8. In a hitch of the character described, laterally spaced guides, a clevis having a latch engaging portion operable in said space between the guides, rollers carried by the latch engaging portion of the clevis and operable in the guides, a latch pivotally mounted on the guides having a hook portion for latchably engaging the latch engaging portion of the clevis, a cam portion engageable by the clevis to rock the latch, and a stop arm for supporting the latch in latch engaging position.

ELDON G. TIDWELL.

REFERENCES CITED

The following references are of record in the file of this patent:

UNITED STATES PATENTS

| Number | Name | Date |
| --- | --- | --- |
| 2,121,240 | Austin | June 21, 1938 |
| 2,158,340 | Spieth | May 16, 1939 |